US009626600B2

(12) United States Patent
Liu et al.

(10) Patent No.: US 9,626,600 B2
(45) Date of Patent: Apr. 18, 2017

(54) EVENT ANALYZER AND COMPUTER-READABLE STORAGE MEDIUM

(71) Applicant: YOKOGAWA ELECTRIC CORPORATION, Musashino-shi, Tokyo (JP)

(72) Inventors: Zhuo Liu, Musashino (JP); Yuichi Sakuraba, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 46 days.

(21) Appl. No.: 14/257,234

(22) Filed: Apr. 21, 2014

(65) Prior Publication Data

US 2014/0317040 A1    Oct. 23, 2014

(30) Foreign Application Priority Data

Apr. 22, 2013   (JP) .................................. 2013-089031

(51) Int. Cl.
*G06N 5/02* (2006.01)
*G06K 9/62* (2006.01)
(Continued)

(52) U.S. Cl.
CPC ............ *G06K 9/6296* (2013.01); *G06F 11/00* (2013.01); *G06N 7/005* (2013.01); *G06N 5/022* (2013.01)

(58) Field of Classification Search
None
See application file for complete search history.

(56) References Cited

U.S. PATENT DOCUMENTS

2012/0005534 A1    1/2012  Li et al.

FOREIGN PATENT DOCUMENTS

| CN | 102262690 A   | 11/2011 |
| JP | 2005-216148 A | 8/2005  |
| JP | 2005-222115 A | 8/2005  |

OTHER PUBLICATIONS

Xiaoyu Fu, Rui Ren, Jianfeng Zhan, Wei Zhou, Zhen Jia, Gang Lu, "LogMaster: Mining Event Correlations in Logs of Large-scale Cluster Systems", 2012 31st International Symposium on Reliable Distributed Systems, Oct. 1, 2012, pp. 71-80.*

(Continued)

*Primary Examiner* — Kakali Chaki
*Assistant Examiner* — Walter Hanchak
(74) *Attorney, Agent, or Firm* — Westerman, Hattori, Daniels & Adrian, LLP

(57) ABSTRACT

An event analyzer includes an event log collection module configured to collect an event log, an event log storage module configured to convert the event log into an event matrix and to store the event matrix, an event occurrence-order determination module configured to determine occurrence-order of device events based on the event matrix, a Bayesian network generation module configured to specify device events serving as parent node candidates, to calculate evaluation values corresponding to each specified parent node candidate at a virtual device event obtained by shifting the device event serving as a processing object each unit time, and to select an device event serving as a parent node together with a shift amount, and an analysis module configured to output an device event estimated as a cause of an device event to be analyzed, or an device event estimated to occur later based on the shift amount.

5 Claims, 14 Drawing Sheets

(51) Int. Cl.
G06F 11/00 (2006.01)
G06N 7/00 (2006.01)

(56) References Cited

OTHER PUBLICATIONS

Dirk Husmeier, "Introduction to Learning Bayesian Networks from Data", Chapter 2 from Husmeier, Dirk, Dybowski, Richard, Roberts, Stephen (Eds.), "Probabilistic Modeling in Bioinformatics and Medical Informatics", Springer-Verlag, 2005, pp. 17-57.*
Ana Gainaru, Franck Cappello, Marc Snir, William Kramer, "Fault prediction under the microscope: a closer look into HPC systems", SC '12 Proceedings of the International Conference on High Performance Computing, Networking, Storage and Analysis, Article No. 77, Nov. 16, 2012, pp. 1-11.*
Joshi Fullop, Ana Gainaru, Joel Plutchak, "Real Time Analysis and Event Prediction Engine", "https://cug.org/proceedings/attendee_program_cug2012/.../pap155.pdf", May 3, 2012, pp. 1-11.*
Pearl, "Probabilistic Reasoning in Intelligent Systems: Networks of Plausible Inference", Morgan Kaufmann Publishers, Inc., 1988.
Kruegel et al., "Bayesian Event Classification for Intrusion Detection", Computer Security Applications Conference, 2003, pp. 14-23.
M. Singh et al., "An Algorithm for the Construction of Bayesian Network Structures from Data", 2003, pp. 259-265.
Extended European Search Report dated Jul. 26, 2016, issued in counterpart European Patent Application No. 14165471.5. (8 pages).

* cited by examiner

*FIG. 3*

| TIME AND DATE | DEVICE IDENTIFIER | EVENT IDENTIFIER |
|---|---|---|
| 2012/10/21 18:00:00 | TAG1 | ALARM1 |
| 2012/10/21 18:00:03 | TAG2 | OP1 |
| 2012/10/21 18:00:04 | TAG3 | ALARM2 |
| 2012/10/21 18:00:06 | TAG2 | ALARM3 |
| ⋮ | ⋮ | ⋮ |

FIG. 4

| TIME AND DATE | TAG1:ALARM1 | TAG2:ALARM3 | TAG2:OP1 | TAG3:ALARM2 | ... |
|---|---|---|---|---|---|
| 2012/10/21 18:00:00 | 1 | 0 | 0 | 0 | ... |
| 2012/10/21 18:00:01 | 0 | 0 | 0 | 0 | ... |
| 2012/10/21 18:00:02 | 0 | 0 | 0 | 0 | ... |
| 2012/10/21 18:00:03 | 0 | 0 | 1 | 0 | ... |
| 2012/10/21 18:00:04 | 0 | 0 | 0 | 1 | ... |
| 2012/10/21 18:00:05 | 0 | 0 | 0 | 0 | ... |
| 2012/10/21 18:00:06 | 0 | 1 | 0 | 0 | ... |

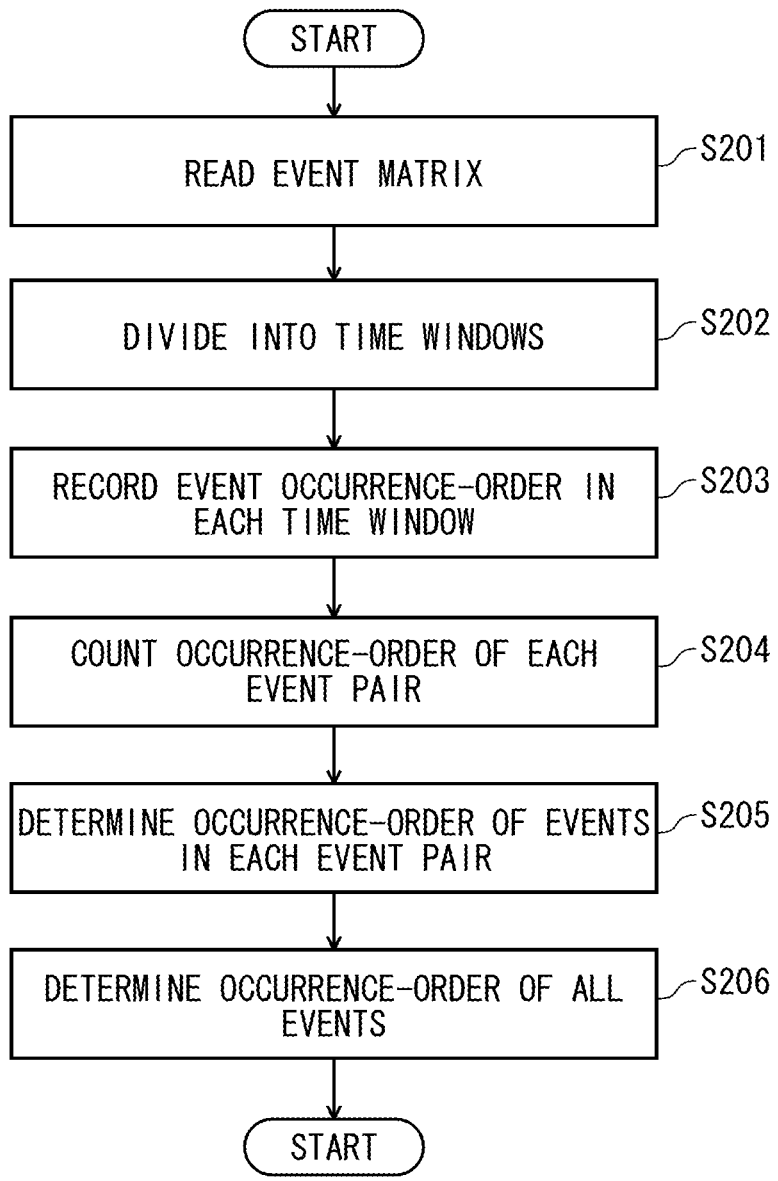

| EVENT A OCCURRENCE-ORDER | 1 | - | 1 | 2 |
|---|---|---|---|---|
| EVENT B OCCURRENCE-ORDER | - | 1 | 2 | 1 |
| EVENT C OCCURRENCE-ORDER | 2 | 2 | 3 | 2 |

| Pair{A, B} | - | - | A→B | B→A |
|---|---|---|---|---|
| Pair{A, C} | A→C | - | A→C | C=A |
| Pair{B, C} | - | B→C | B→C | B→C |

Pair{A, B} : $N_{A→B}(=1) = N_{B→A}(=1) > N_{A=B}(=0)$ ⟹ <u>DETERMINED AS A→B</u>
<u>FIRST OCCURRENCE TIME : A→B</u>

Pair{A, C} : $N_{A→C}(=2) > N_{A=C}(=1) > N_{C→A}(=0)$ ⟹ <u>DETERMINED AS A→C</u>

Pair{B, C} : $N_{B→C}(=3) > N_{C→B}(=0) = N_{B=C}(=0)$ ⟹ <u>DETERMINED AS B→C</u>

<u>DETERMINED AS A→B→C</u>

| TIME AND DATE | TAG1:ALARM1 | TAG2:ALARM3 | TAG2:OP1 | TAG3:ALARM2 | ... |
|---|---|---|---|---|---|
| 2012/10/21 18:00:00 | 1 | 0 | 0 | 0 | ... |
| 2012/10/21 18:00:01 | 0 | 0 | 0 | 0 | ... |
| 2012/10/21 18:00:02 | 0 | 0 | 0 | 0 | ... |
| 2012/10/21 18:00:03 | 0 | 0 | 1 | 0 | ... |
| 2012/10/21 18:00:04 | 0 | 0 | 0 | 0 | ... |
| 2012/10/21 18:00:05 | 0 | 0 | 0 | 0 | ... |
| 2012/10/21 18:00:06 | 0 | 1 | 0 | 0 | ... |

TIME-BLOCKING OF TIME UNIT OF 1 sec. INTO TIME UNIT OF 1 min.

| TIME AND DATE | TAG1:ALARM1 | TAG2:ALARM3 | TAG2:OP1 | TAG3:ALARM2 | ... |
|---|---|---|---|---|---|
| 2012/10/21 18:00 | 1 | 1 | 1 | 0 | ... |
| 2012/10/21 18:01 | 0 | 0 | 0 | 0 | ... |
| 2012/10/21 18:02 | 1 | 0 | 1 | 1 | ... |
| 2012/10/21 18:03 | 0 | 1 | 0 | 0 | ... |
| 2012/10/21 18:04 | 1 | 0 | 0 | 1 | ... |
| 2012/10/21 18:05 | 0 | 0 | 1 | 0 | ... |
| 2012/10/21 18:06 | 1 | 1 | 0 | 1 | ... |

# EVENT ANALYZER AND COMPUTER-READABLE STORAGE MEDIUM

CROSS-REFERENCE TO RELATED APPLICATION(S)

The present application claims the benefit of priority of Japanese Patent Application No. 2013-089031 filed on Apr. 22, 2013. The disclosures of the application are incorporated herein by reference.

BACKGROUND

Technical Field

The present disclosure relates to an event analyzer that analyzes events, such as alarms occurred in a plant or the like and operation procedures followed by operators, and that extracts the causal relationship among evens in consideration of occurrence-time differences, and to a computer-readable storage medium.

Related Art

An event analyzer is known, which acquires and analyzes events, such as alarms which occur in a plant or the like and operation procedures followed by operators, in a distributed control system or the like, which controls field devices, such as sensors and actuators, using control systems, such as field controllers distributed in a plant.

FIG. 14 is a block diagram illustrating the configuration of a related-art event analyzer. As illustrated in this diagram, an event analyzer 300 has an event log collection module 310, an event log analysis module 320, and an analysis result output module 330.

In some case, events such as records of operators' operations performed on a control system 360 are saved by the control system 360 as logs, while, in some case, a historian 370 saves the events as logs. The event log collection module 310 collects event logs from one or both of the control system 360 and the historian 370. Then, the event log collection module 310 records the event logs in an event log database 340 provided inside or outside the event analyzer 300.

The event log analysis module 320 performs statistical processing, such as calculations of the occurrence frequency and the occurrence rate of each event on the events recorded in the event log database 340. An event list, an occurrence status histogram, and statistical processing results are indicated in a display device 350 via an analysis result output module 330. Users can improve plant operating efficiency by referring to such information indicated in the display device 350.

PRIOR ART DOCUMENT

Patent Document

[Patent Document 1] JP-A-2005-216148

Non-patent Document

[Non-patent Document 1] J. Pearl "Probabilistic Reasoning in Intelligent Systems: Networks of Plausible Inference", Morgan Kaufman, 1988.

Usually, events, such as alarms occurred in a plant and operation procedures followed by operators, at the control systems are not independent of and have association with one another. For example, there are cases that a certain alarm occurs due to a specific operation, and that a certain alarm occurs in succession with another alarm.

Hitherto, in event analyzers, only analyses such as simple statistic processing have been performed. Thus, users should determine the relationship among events. However, if an analysis enabling a user to grasp the causal relationship among events is realized, the prediction of an event which will occur subsequently to another event is facilitated. Such an analysis is convenient.

Moreover, according to the inter-relationship among various events at a control system in a plant, the events often have a certain time-lag. Thus, it is desired to enable the grasping of the causal relationship among events in consideration of the occurrence-time differences among events.

SUMMARY

Exemplary embodiments of the invention provide an event analyzer and a computer-readable storage medium, which can grasp the causal relationship among events in consideration of the occurrence-time difference among the events.

An event analyzer configured to analyze events including alarms which occur in a plurality of devices, and operations which are performed on the plurality of devices, the event analyzer, comprises:

an event log collection module configured to collect an event log including occurrence-time-and-date of the event, a device identifier, and an event-type identifier;

an event log storage module configured to convert the event log into an event matrix that represents, in chronological order, presence/absence of occurrence of each device event obtained by combining the device identifier with the event type identifier with each other, and to store the event matrix;

an event occurrence-order determination module configured to determine occurrence-order of device events, based on the event matrix;

a Bayesian network generation module configured to specify device events serving as parent node candidates with respect to a device event serving as a processing object, based on the occurrence-order, to calculate evaluation values corresponding to each specified parent node candidate, based on an information amount reference, at a virtual device event obtained by shifting the device event serving as a processing object each unit time, and to select an device event serving as a parent node together with a shift amount, thereby to generate a Bayesian network; and an analysis module configured to output a device event estimated as a cause of a device event to be analyzed, or a device event estimated to occur later, together with time-difference information based on the shift amount.

In the event analyzer, the event occurrence-order determination module divides the event matrix into time windows having a predetermined time width, and determines occurrence-order of entirety of the device events, based on occurrence-order of device events in each time window.

In the event analyzer, in a case where another parent node is selected, from unselected parent node candidates, for the device event serving as a processing object for which parent nodes have been selected, the Bayesian network generation module calculates the evaluation values, based on the information amount reference, at the virtual-device event obtained by shifting selected parent nodes and the device event serving as a processing object as a set of nodes each unit time, in a state in which a relative-shift amount of each of the selected parent nodes to the device event serving as a processing object at the time of selecting the parent node is maintained.

In the event analyzer, a maximum value of the shift amount is equal to the time width of each time window.

A computer-readable storage medium stores a program which allows a computer to function as an event analyzer configured to analyze events including alarms which occur in a plurality of devices, and operations performs on the plurality of devices, the event analyzer comprising:

an event log collection module configured to collect an event log including occurrence-time-and-date of the event, a device identifier, and an event-type identifier;

an event log storage module configured to convert the event log into an event matrix that represents, in chronological order, presence/absence of occurrence of each device event obtained by combining the device identifier with the event type identifier with each other, and to store the event matrix;

an event occurrence-order determination module configured to determine occurrence-order of device events, based on the event matrix;

a Bayesian network generation module configured to specify device events serving as parent node candidates with respect to a device event serving as a processing object, based on the occurrence-order, to calculate evaluation values corresponding to each specified parent node candidate, based on an information amount reference, at a virtual device event obtained by shifting the device event serving as a processing object each unit time, and to select an device event serving as a parent node together with a shift amount, thereby to generate a Bayesian network; and an analysis module configured to output a device event estimated as a cause of a device event to be analyzed, or a device event estimated to occur later, together with time-difference information based on the shift amount.

According to the exemplary embodiment of the invention, it is possible to provide an event analyzer and a computer-readable storage medium, which can grasp the causal relationship among events in consideration of the occurrence-time difference among the events.

BRIEF DESCRIPTION OF THE DRAWINGS

FIG. 3 is a drawing illustrating event logs.

FIG. 4 is a drawing illustrating an event matrix.

FIG. 5 is a flowchart illustrating a process of determining the occurrence-order of device events, based on an event matrix, by an event occurrence-order determination module.

DETAILED DESCRIPTION

Figure 1:
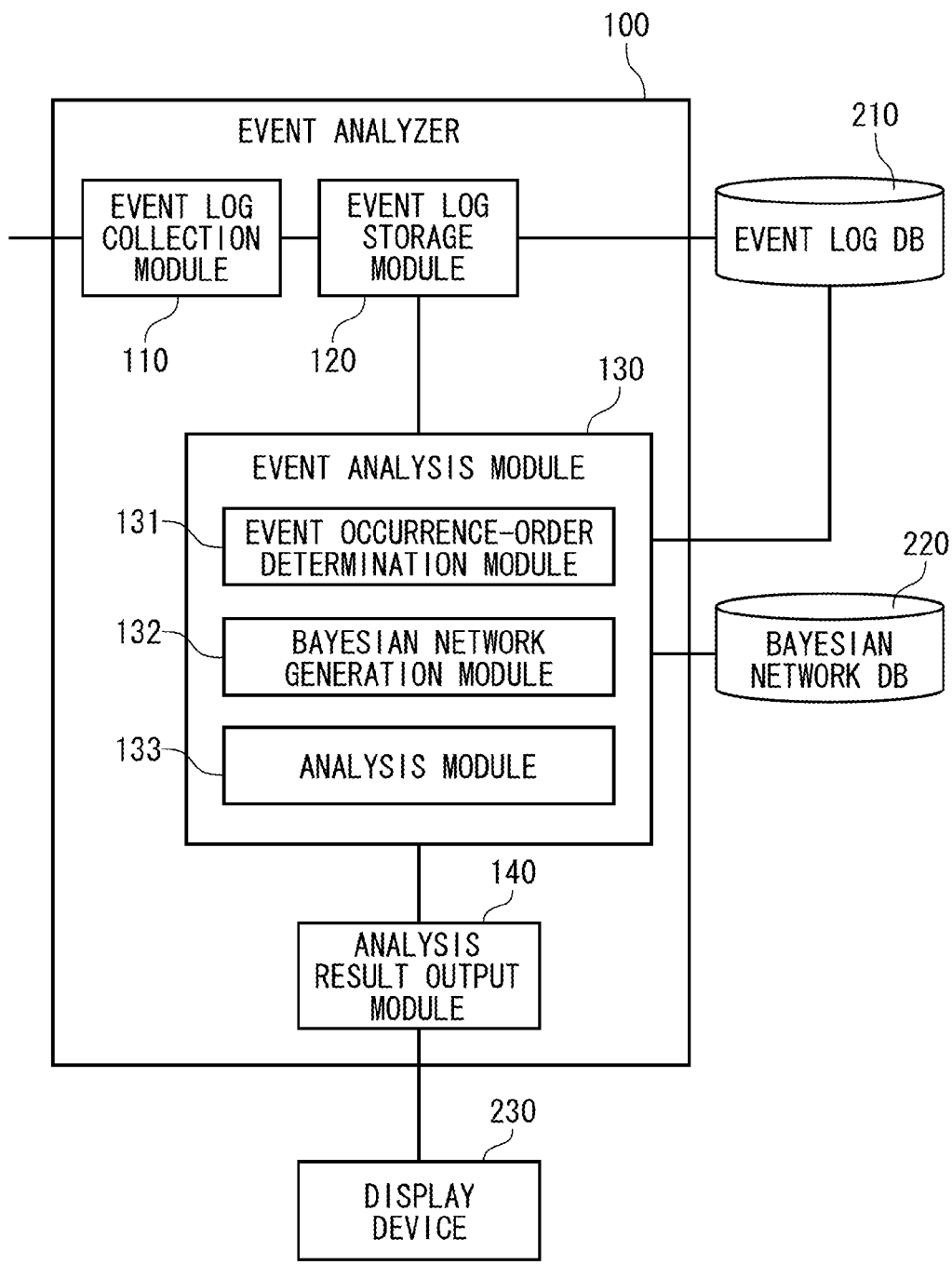
FIG. 1 is a block diagram illustrating the configuration of an event analyzer according to this embodiment.

An embodiment of the invention is described hereinafter with reference to the accompanying-drawings. FIG. 1 is a block diagram illustrating the configuration of an event analyzer according to this embodiment. As illustrated in this figure, an event analyzer 10 includes an event collection module 110, an event log storage module 120, an event analysis module 130 and an analysis result output module 140.

The event analyzer 100 may be configured using a general-purpose information processing unit such as a personal computer and a server computer. That is, the information processing unit can function as the event analyzer 100 by executing a computer program for performing processing which will be described hereinafter. Apparently, the event analyzer 100 may be configured as a dedicated device.

The event log collection module 110 collects event logs from the control system connected thereto, the historian and the like, similarly to the related-art one. The event logs include time and date at which each event occurs, an identifier (tag) of device at which each event occurs, an identifier of the type of each event, and the like.

The event log storage module 120 records event logs collected by the event log collection module 110 in an event log database (DB) 210 provided inside or outside the event analyzer 100. The event log storage module 120 also records data of the type, which is suited to analysis performed by the event analysis module 130 and obtained by converting each associated event log.

More specifically, a matrix is generated by setting the time axis of the minimum time unit of each event log so as to extend in one of longitudinal and transversal directions, and arranging, in the opposite direction, items obtained by combining the identifier of the device with the identifier of the event type. Then, the form of the matrix is converted into another form in which information indicating the occurrence of each event included in the event logs is input to each of columns respectively corresponding to the occurrence time-and-date of the event, the device at which the event occurs, and the type of the event. Thus, the event matrix is obtained.

Hereinafter, data obtained by converting the event log is referred to as an "event matrix". The combination of the device and the type of the event is referred to as a "device event". For example, an event "ALARM1" occurred in device "TAG1" is represented as a device event "TAG1: ALARM1". An operation "OP1" performed on device "TAG2" is represented as a device event "TAG2: OP1".

The event log DB 210 recording the event matrix can record a large-volume matrix. Therefore, it is preferable that a distributed DB, such as NoSQL, which is flexible in horizontal scalability, is used as the event log DB 210. This is because of the facts that the event maxis has high capacity, and that there is a case where the number of devices changes during an operation of a plant, so that flexibility is required. Apparently, a general-purpose DB can be used as the event log DB 210.

The event analysis module 130 is a functional module that analyzes the causal relationship among device events, which is represented using a Bayesian network, in consideration of the occurrence-time difference among the device events. More specifically, the event analysis module 130 performs a process of constructing a Bayesian network based on the event matrix generated by the event storage module 120, a process of analyzing an device event serving as a cause of a device event to be analyzed (i.e., a device event serving as analysis object), and a predicted device event corresponding to the device event serving as analysis object, and a process of outputting an analysis result to the display device 230 or the like via the analysis result output module 140.

In order to perform these processes, the event analysis module 130 includes an event occurrence-order determination module 131, a Bayesian network generation module 132, and an analysis module 133. The process performed at each of the functional blocks will be described below. Moreover, a Bayesian network DB 220 for storing the generated Bayesian network is provided inside or outside the event analyzer 100.

The Bayesian network is a stochastic reasoning model which is one of graphical models describing the causal relationship using probability, and which represents the reasoning of the complex causal relationship with a directed-graph structure and which also represents the relationship among individual variables with conditional probability.

A causal feature is represented as a network represented by a directed graph. Then, the stochastic reasoning is performed. Thus, the occurrence-rate and the occurrence-possibility of a complicated and uncertain event can be predicted. The occurrence-probability of each of such events is obtained on the basis of information accumulated thus far, and calculated along a development path. Thus, the probability of occurrence of the causal relationship with the complicated path can be represented quantitatively.

Thus, a device event serving as a cause of a certain device event can be represented stochastically using the Bayesian network. Moreover, a possible device event, which may occur after the occurrence of the certain device event, ca be represented stochastically. Furthermore, by constructing the Bayesian network using event logs for long period of time, factors, such as a seasonal variation and a periodical repair, can be included in factors to be considered in the analysis.

In the related art, the Bayesian network is constructed by a process, typified by K2-algorithm, of studying simultaneous occurrence situation of plural events and thus extracting the causal relationship among events. According to the inter-relationship among device events at the control system in the plant, the device events do not necessarily simultaneously occur. The device events often have a certain time-lag. Accordingly, according to this embodiment, K2-algorithm is improved, so that a Bayesian network is constructed in consideration of the occurrence-time difference of device events.

Figure 2:
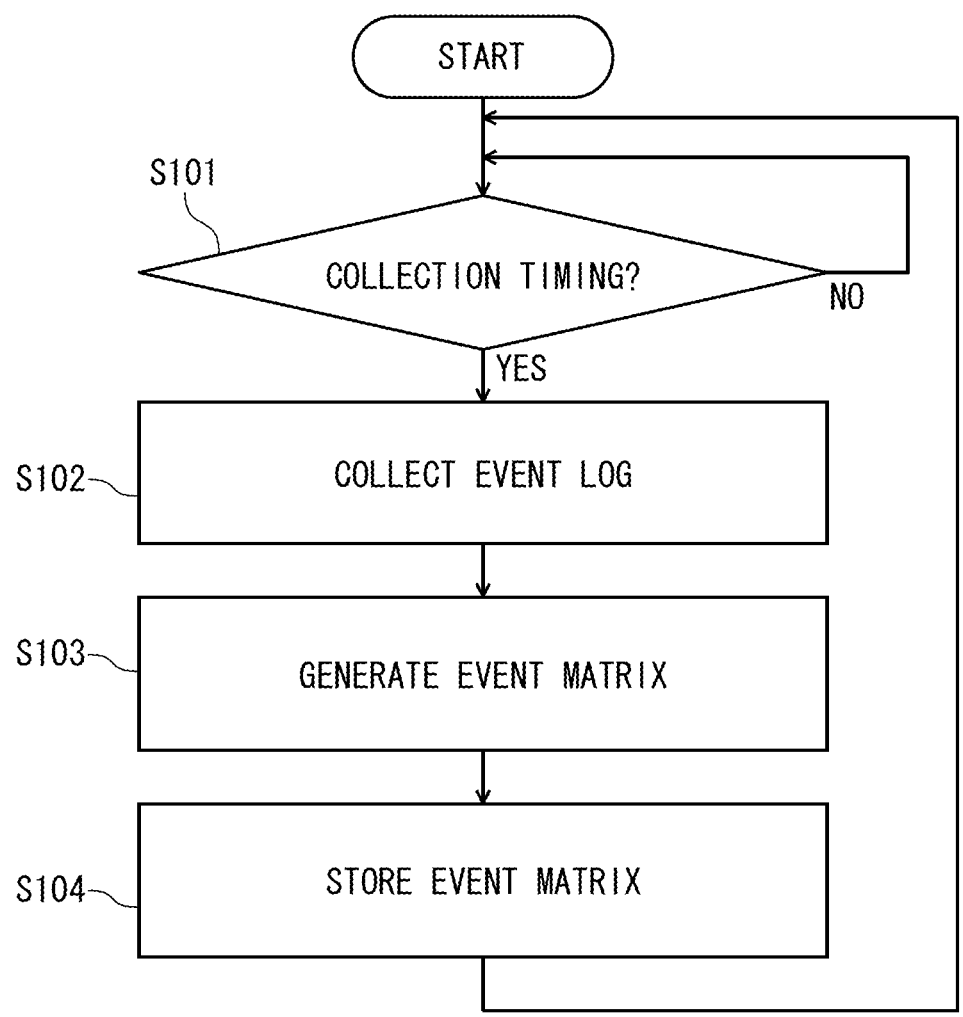
FIG. 2 is a flowchart illustrating an operation of each of an event log collection module and an event log storage module.

Next, an operation of the event analyzer 100 is described. First, an operation of each of the event log collection module 110 and the event log storage module 120 is described with reference to a flowchart illustrated in FIG. 2. If it is a predetermined collection timing (Yes in step S101), in step S102, the event log collection module 110 collects event logs from the control system, the historian, and the like.

As an example is illustrated in FIG. 3, the event log includes the time and date of occurrence of each event, and the device identifier (tag) and the event identifier of each event. Further, the event log may include information representing an event type, such as an "operation" and an "alarm". The example illustrated in FIG. 3 indicates that an alarm "ALRM1" occurred at device "TAG1" at 18:00:00 on Oct. 21, 2012, and that an operation "OP1" was performed on device "TAG2" at 18:00:03 on Oct. 21, 2012.

Timing to collect event logs can be set to a constant periodic timing, a timing designated by a user, a predetermined timing triggered, or the like. It is advisable to preliminarily set the timing to collect event logs.

Upon collecting event logs, in step S103, the event log storage module 120 generates an event matrix based on the event log. As described above, the event matrix is obtained as follows. That is, first, a matrix is generated by setting the time axis of the minimum time unit of each event log so as to extend in one of longitudinal and transversal directions, and arranging, in the opposite direction, items obtained by combining the identifier of the device with the identifier of the event type. Then, the form of this matrix is converted into another form in which information indicating the occurrence of each event included in the event logs is input to each of columns respectively corresponding to the occurrence time-and-date of the event, the device at which the event occurs, and the type of the event.

FIG. 4 illustrates an event matrix obtained by converting the event log illustrated in FIG. 3. Here, the minimum time unit of the event log is set at 1 second. Thus, the items are arranged at the interval of 1 second in the longitudinal direction of the event matrix. Further, in the lateral direction of the event matrix, the device events, each of which is obtained by combining the device identifier with the event-type identifier, are arranged. For example, columns such as "TAG1: ALM1", "TAG2: ALARM3", and "TAG2: OP1" are generated. FIG. 4 shows only four columns; however, in actual fact, columns obtained by combining the respective devices with the respective event types are produced.

According to this example, the alarm "ALRM1" is generated at the device "TAG1" at 18:00:00 on Oct. 21, 2012. Therefore, "1" is input to an associated column as information indicating that a device event occurs. Similarly, because the operation "OP1" is performed on the device "TAG2" at 18:00:03 on Oct. 21, 2012, "1" is input to an associated column. Incidentally, "0" is input to each of columns in which no device events occur.

When the event matrix is generated, in step S104, the event log storage module 120 records the generated event matrix together with the event log in the event log DB 210. At that time, it is advisable to additionally record such data to previous data so as to be able to also use the previous data. Then, in step S101, the event log collection module 110 waits for the next collection timing.

Next, the process of constructing a Bayesian network, based on the event matrix, by the event analysis module 130 is described hereinafter. The process of constructing a Bayesian network by the event analysis module 130 can be divided into the process of determining the occurrence-order of device events, based on the event matrix, by the event occurrence-order determination module 131 of the event analysis module 130 and the process of generating a Bayesian network by the Bayesian network generation module 132 of the event analysis module 130.

First, the process of determining the occurrence-order of device events, based on an event matrix, by the event occurrence-order determination module 131 is described with reference to a flowchart illustrated in FIG. 5. It is necessary for constructing a Bayesian network to specify candidates for a parent node. Thus, the event occurrence-order determination module 131 determines the occurrence-order of the device events, based on the event matrix.

Incidentally, a device event at a cause side is called a parent node, while a device event at a result side is called a child node.

Algorithms for determining the occurrence-order of device events include a calculation method based on the maximum correlation value of a cross-correlation function, as described in Patent Document 1. However, because the calculation of the cross-correlation function takes time, the occurrence-order of device events is determined faster in the following procedure according to this embodiment.

In step S201, at predetermined update timing, the event occurrence-order determination module 131 of the event analysis module 130 reads an event matrix recorded in the event log DB 210. That is, the Bayesian network is updated at predetermined timing. The timing of updating a Bayesian network can be set to a constant periodic timing, a timing designated by a user, a predetermined timing triggered, or the like. It is advisable to preliminarily set the timing to update the Bayesian network.

Next, in step S202, an event matrix is extracted at a predetermined time width to divide the event matrix into time windows. The time width of each time window is set to the maximum value of the occurrence-time difference assumed among device events associated with one another. In the case of a plant assumed so that the occurrence-time difference among device events having causal relationship does not exceed 1 hour, it is sufficient to set the time width of each time window to 1 hour.

The time width of each time window can be changed according to a plant to be analyzed, or to the purpose of analysis. For example, when a plant configured mainly by devices having few lag-factors, such as a flow rate and a pressure, is analyzed, the time width of each time window can be reduced. When a plant configured mainly by devices having many lag-factors, such as a temperature, is analyzed, the time width of each time window can be increased.

Figures 6A, 6B, 6C, 6D:
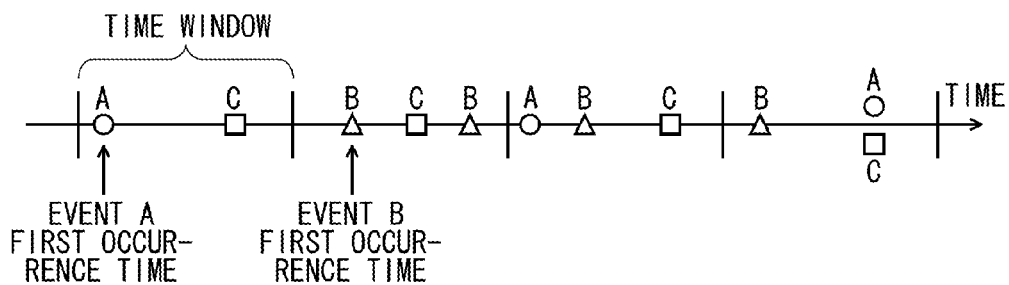
FIGS. 6A to 6D are drawings illustrating the process of determining the occurrence-order of device events.

When the event matrix is divided into time windows, in step S203, the occurrence-order of device events in each time window is recorded. For example, the event matrix (in FIG. 6A, the event matrix is represented like a straight-line, and each "device event" is referred to simply as "event") according to which device events occur in an order illustrated in FIG. 6A, is extracted as four time windows. Then, it is recorded that device event A occurs first and device event C occurs second in the first time window, as illustrated in FIG. 6B, and that similarly, device events A, B, and C occur in this order in the third time window.

Next, in step S204, each device-event pair is generated by combining device events with each other. The occurrence-orders in each of the device-event pairs are counted. The device-event pairs are generated from all of the device events. For example, if a device-event pair of interest is assumed to be a pair of the device events A and B, the counting of the occurrence-orders is performed as follows in time windows, in each of which both of the device events A and B occur. That is, the number of times of occurrence of the device event A ahead of the other device event B, the number of times of occurrence of the device event B ahead of the other device event A, and the number of times of simultaneous occurrence of the device events A and B are counted.

For example, in an example illustrated in FIG. 6B, regarding an device-event pair Pair {A, B} of the device events A and B, both of the number of times of occurrence of the device event A ahead of the other device event B and the number of times of occurrence of the device event B ahead of the other device event A are counted as 1. Regarding a device-event pair Pair {A, C} of the device events A and C, the number of times of occurrence of the device event A ahead of the other device event C is counted as 2. The number of times of occurrence of the device event C ahead of the other device event A is counted as 0. The number of times of simultaneous occurrence of the device events A and C is counted as 1. Further, regarding the device-event pair Pair {B, C}, the number of times of occurrence of the device event B ahead of the other device event C is counted as 3.

Then, in step S205, the occurrence-order of the device events in each of the device-event pairs is determined, based on the counted numbers. The occurrence-order of the device events in each of the device-event pairs is determined by considering the device event having the largest number of times of occurrence in the device-event pair as the device event occurring ahead of the other device event in this device-event pair.

For example, as illustrated in FIG. 6D, regarding the device-event pair Pair {A, C}, the number of times of occurrence of the device event A ahead of the other device event C is counted as 2. The number of times of simultaneous occurrence of the device events A and C is counted as 1. The number of times of occurrence of the device event C ahead of the other device event A is counted as 0. Therefore, the occurrence-order of the device events A and C is determined as A→C.

Incidentally, as in the case of the device-event pair Pair {A, B}, that is, in the case where the number of times of occurrence of the device event A ahead of the other device event B is equal to the number of times of occurrence of the device event B ahead of the other device event A, the occurrence-order, in which the device event occurring earliest in the event matrix is considered as the device event occurring ahead of the other device event, is determined as the occurrence-order of the device events in the device-event pair. In this example, as illustrated in FIG. 6A, the device event A occurs earliest. Thus, the occurrence-order of the pair of the device events A and B is determined as A→B.

If the occurrence-order of each device event pair is determined, in step S206, the occurrence-orders of all of the device events are determined, based on the determined occurrence-order of each device event pair. A general-purpose sort algorithm or the like can be used for the determination of the order. A parent node candidate corresponding to each device event can be specified by determining the occurrence-order of the device events. That is, a parent node candidate for a certain device event is each device event which occurs earlier than the certain device event.

The process of determining the order of occurrence of device events by the event occurrence-order determination module 131, based on the event matrix, has been described hereinabove.

Next, the process of generating the Bayesian network by the Bayesian network generation module 132 of the event analysis module 130 is described hereinafter. The process of generating a Bayesian network according to this embodiment is developed by improving the K2 algorithm which is a typical Bayesian network constructing method. A parent node for each device event is selected from parent node candidates specified by determining the occurrence-order of the device events. An information amount reference, such as a minimum description length (MDL) based on the conditioned probability P (a child node| parent nodes), is used as an evaluation value for selecting parent nodes.

Figure 7:
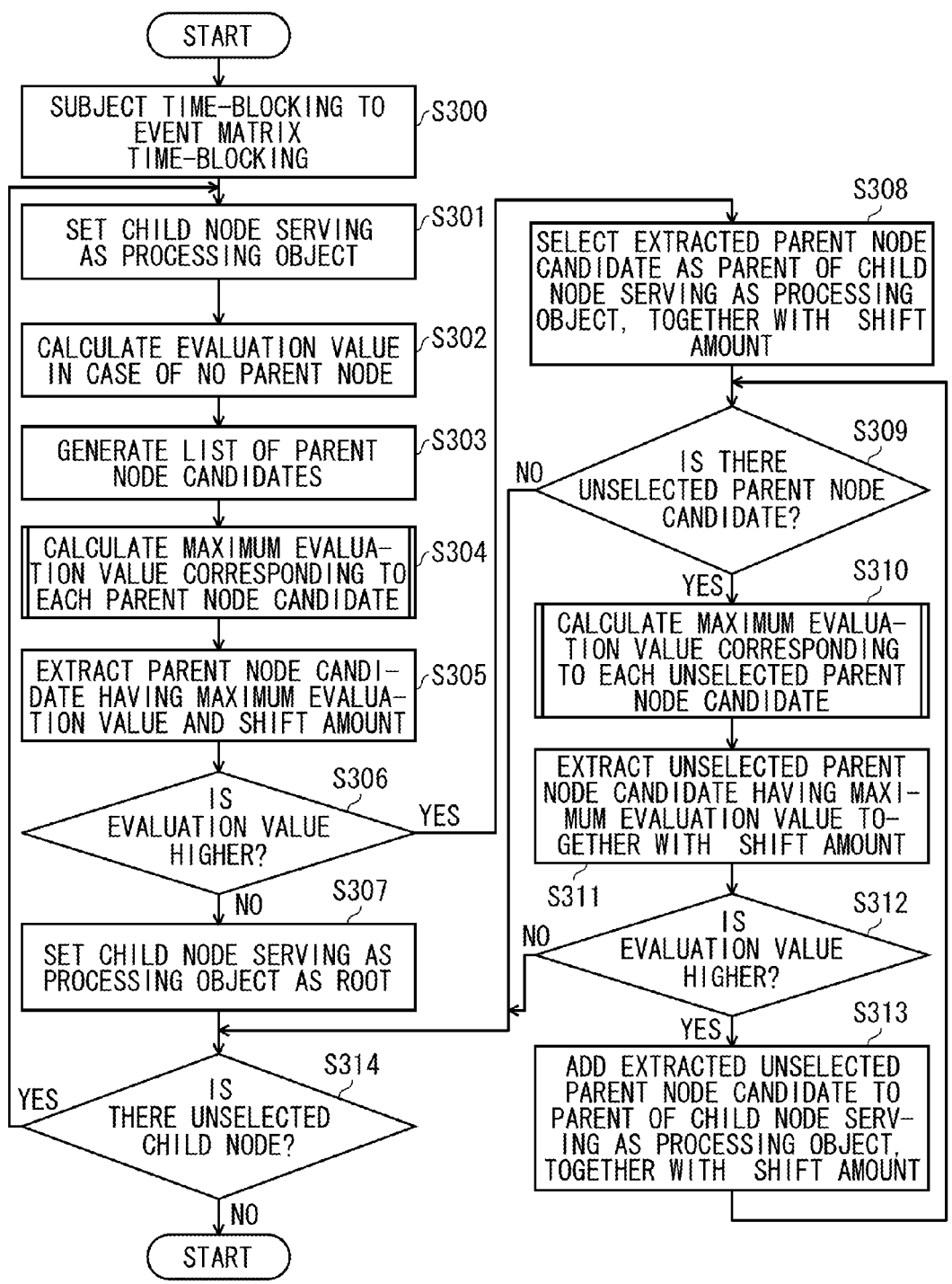
FIG. 7 is a flowchart illustrating a process of generating a Bayesian network by a Bayesian network generation module.

FIG. 7 is a flowchart illustrating the process of generating a Bayesian network by the Bayesian network generation module 132.

It is considered that even in the case of the device events interrelated to each other with a time difference, the occurrence timing difference between the device events is not constant, and the occurrence timing difference varies. Thus, if a Bayesian network is generated with reference to the minimum time unit of the event matrix, the association among the device events may insufficiently be evaluated. Accordingly, according to this embodiment, in step S300, in order to construct the Bayesian network, the process of changing the time units of the event matrix into a longer time unit is performed. This process is referred as "time-blocking" of an event matrix. In the following process, it is assumed that processing is performed using an event matrix subjected to the "time-blocking".

Figure 8:
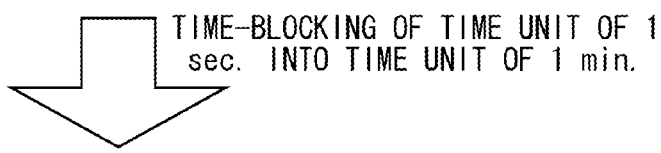
FIG. 8 is a drawing illustrating a process of "time-blocking" of the event matrix.

FIG. 8 illustrates an example of the "time-blocking", i.e., changing of the minimum time unit of 1 second of an event matrix into a time-unit, i.e., a "time block" of 1 minute. The number of device events that occur in the time width of the time block subjected to the "time-blocking" is represented in FIG. 8. Incidentally, a Bayesian network may be constructed using the minimum unit time of the event matrix without performing the "time-blocking". Additionally, the unit time of the "time block" can optionally be determined according to the plant to be analyzed, the purpose of the analysis, and the like.

Further, in a case where various devices are present in the plant, analysis may be performed by determining plural unit times instead of a single unit time and constructing a Bayesian network according to the time width of each of the unit times. In order to facilitate this process, the event matrix is configured to set the time axis of the minimum time unit of each event log so as to extend.

Meanwhile, if the related-art K2-algorithm is applied to the generation of a Bayesian network without being modified, the conditioned probability of each of device events simultaneously occurring in the event matrix subjected to the "time-blocking" is calculated, and the parent node of each device event is selected. However, if the occurrence-time differences among the device events are larger than the time unit of the "time block", the causal relationship cannot be evaluated. Thus, according to this embodiment, a parent node of each device event is selected using virtual device events shifted in time to take the occurrence-time differences among the device events into account.

Incidentally, the occurrence-time of each device event is not shifted without limit. The occurrence-time of each device event is shifted within a limit of the maximum value of the occurrence-time difference assumed between the device events interrelated with each other. This maximum shift width is equal to the time width of each time window. The shift is performed in the unit time of the "time block" so that a shift amount changes from 0 to the maximum shift width. The evaluation of the causal relationship is performed at each shift amount.

These processes are described in detail. First, in step S301, a child node serving as a processing object is set. The child node serving as a processing object is set among the device events in an arbitrary order.

In step S302, the evaluation value of the child node set as a processing object is calculated according to the information amount reference in the case where there is no parent node. Moreover, in step S303, a list of parent node candidates is generated. The parent node candidates are device events that occur earlier than the child node serving as a processing object.

Figure 9:
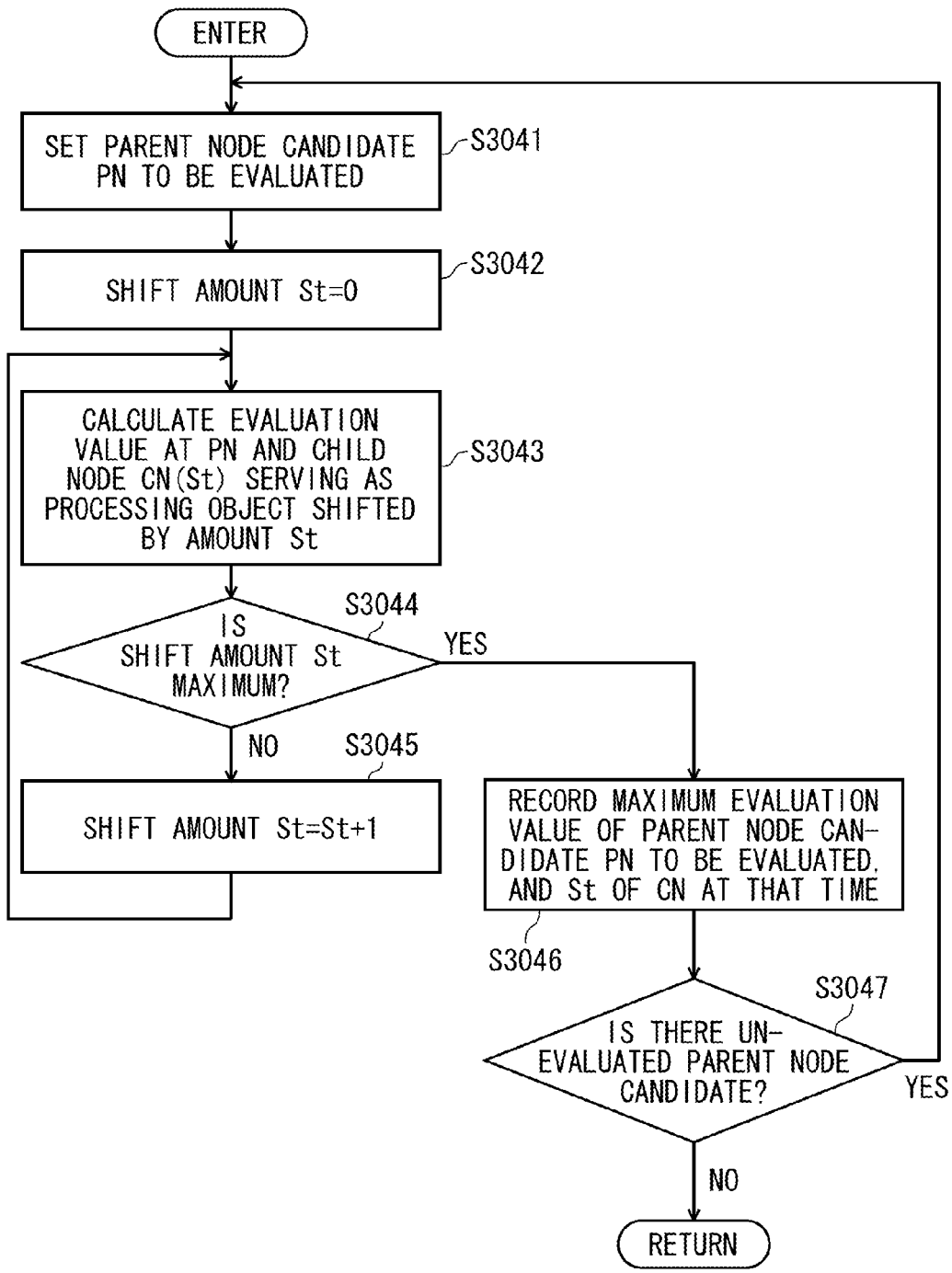
FIG. 9 is a flowchart illustrating a process of calculating the maximum evaluation value corresponding to each of the parent node candidates.

Then, in step S304, the maximum evaluation value is calculated corresponding to each of the parent node candidates. This process is described in detail with reference to a flowchart illustrated in FIG. 9.

First, in step S3041, a parent node candidate PN to be evaluated is set in an arbitrary order from a parent node candidate list. Initially, in step S3042, a shift amount St is set to be 0. Then, in step S3043, an evaluation value is calculated at a child node CN and the parent node candidate PN.

Next, in step S3045, the shift amount is increased by 1. In step S3043, an evaluation value is calculated at each of the child node CN (St) shifted the shift amount of minutes earlier, and the parent node candidate PN. That is, an evaluation value is calculated at the child node which is assumed to occur the shift amount St of minutes earlier.

While the shift amount St is increased in step S3045, the processing performed in step S3043 to calculate an evaluation value at each of the child node CN(St) shifted the shift amount of minutes earlier and the parent node candidate PN is repeated until the shift amount St is maximized in step S3044.

Consequently, the maximum value of the evaluation value corresponding to the parent node candidate PN to be evaluated, and the shift amount St at that time can be obtained. Thus, in step S3046, the maximum evaluation value corresponding to the parent node candidate PN to be evaluated and the shift amount St of the child node CN at that time are recorded.

Figure 11A:
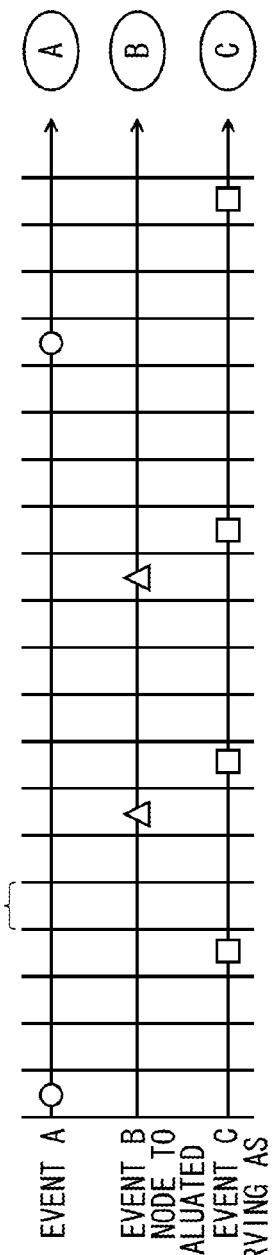
FIGS. 11A to 11C are drawings illustrating a process of calculating evaluation value by shift.
Figure 11B:
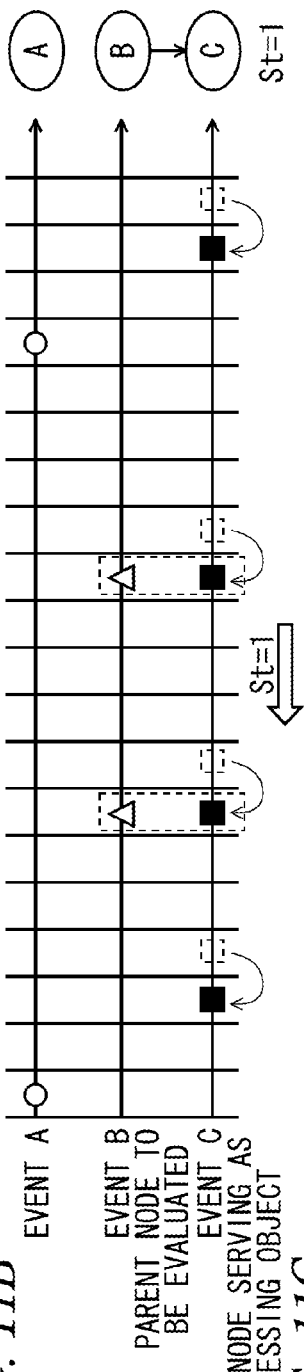

For example, in the event matrix subjected to the "time-blocking" in FIG. 11A, if the device event C is set as a child node serving as a processing object, while the device event B is set as a parent node to be evaluated, FIG. 11B illustrates that the evaluation value is maximized if the shift amount St of the device event C is set to 1 (shift amount St=1).

The above processing is repeatedly performed on all parent node candidates in step S3047. Thus, the processing to calculate the maximum evaluation value at each of the parent node candidates is performed in step S304.

Turning back to the description of the flowchart illustrated in FIG. 7, in step S305, one of the parent node candidates, which is highest in the maximum evaluation value, and the shift amount St at that time are extracted. If the evaluation value of this extracted parent node candidate is not higher than the evaluation value in the case where there is no parent node (No in step S306), the child node serving as a processing object is determined as a root in step S307. Then, the next child node is set in steps S314 and S301, the above process is repeated.

If the maximum evaluation value of the extracted parent node candidate is not higher than the evaluation value in the case where there is no parent node (Yes in step S306), in step S308, the extracted parent node candidate is selected as a parent of the child node serving as a processing object, together with a shift amount.

Then, it is checked whether there is an unselected parent node candidate in the parent node candidate list. If there is no parent node candidate (No in step S309), the processing on the child node is finished. In steps S314 and S301, the next child node serving as a processing object is set. Then, the above process is repeated.

Figure 10:
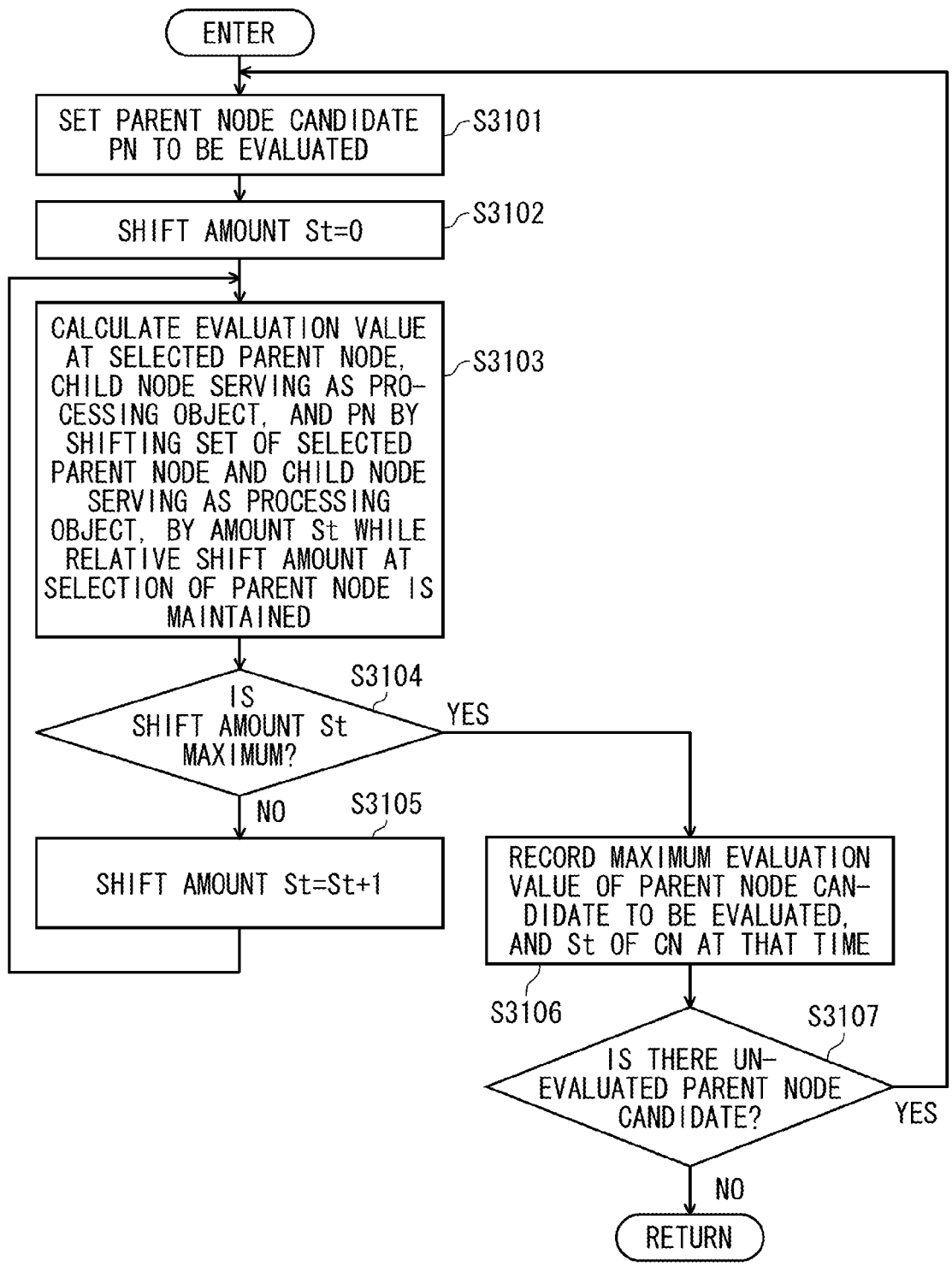
FIG. 10 is a flowchart illustrating a process of calculating the maximum evaluation value corresponding to each of unselected parent node candidates.

If there is an unselected parent node candidate (Yes in step S309), in step S310, the maximum evaluation value is calculated corresponding to each unselected parent node candidate. That is, evaluation processing in the case of adding another parent node candidate to the already selected parent node is performed. This processing is described in detail with reference to a flowchart illustrated in FIG. 10.

First, in step S3101, a parent node candidate PN to be evaluated is set among the unselected parent node candidates in the parent node candidate list. Initially, in step S3102, the shift amount St is set to 0. That is, in step S3103, at the actual time of occurrence of a child node, an evaluation value is calculated at each of the child node CN, the selected parent node, and the parent node candidate PN to be evaluated. At that time, the evaluation value is calculated in a state in which the relative shift amount of the selected parent node to the child node CN at the time of selecting this parent node is maintained. For example, if the shift amount of the child node CN at the time of selecting a certain parent node is 3, the selected parent node is in a state in which the shift amount of the selected parent node to the child node CN is −3. Evaluation values are calculated in a state in which the shift amount of the child node CN is 0, the shift amount of the selected parent node is −3, and the shift amount of the parent node candidate PN to be evaluated to be evaluated is 0.

Next, in step S3105, the shift amount is increased by 1. In step S3103, an evaluation value is calculated at the child node CN shifted earlier by the shift amount of minutes, the selected parent node, and the parent node candidate PN to be evaluated. At that time, the child node CN and the selected parent node are shifted as a set of nodes. That is, the selected parent node is shifted together with the child node CN as a set while the relative shift amount of the selected parent node to the child node CN at the time of selecting this parent node is maintained.

For example, if the shift amount at the time of selecting the parent node is 3 (the relative shift amount is −3), the shift amount of the child node CN is 1, the shift amount of the selected parent node is −3+1=−2, and the shift amount of the parent node candidate PN to be evaluated is 0. Then, the evaluation values are calculated. In the case where there are plural selected parent nodes, while the relative shift amount of each of the selected parent nodes to the child node at the time of selecting the associated parent node is maintained, each of the selected parent nodes is shifted together with the child node as a set.

The processing in step S3103 is the calculation of evaluation values at the child node CN shifted the shift amount of minutes earlier, the selected parent node that maintains the relative shift amount to the child node CN, and the parent node candidate PN to be evaluated. While the shift amount St is increased in step S3105, the processing in step S3103 is repeated until the shift amount St is maximized in step S3104.

Consequently, at the parent node candidate PN to be evaluated, the maximum value of the evaluation value and the shift amount St of the child node CN at that time can be obtained. Thus, in step S3106, the maximum evaluation value and the shift amount at that time are recorded.

Figure 11C:
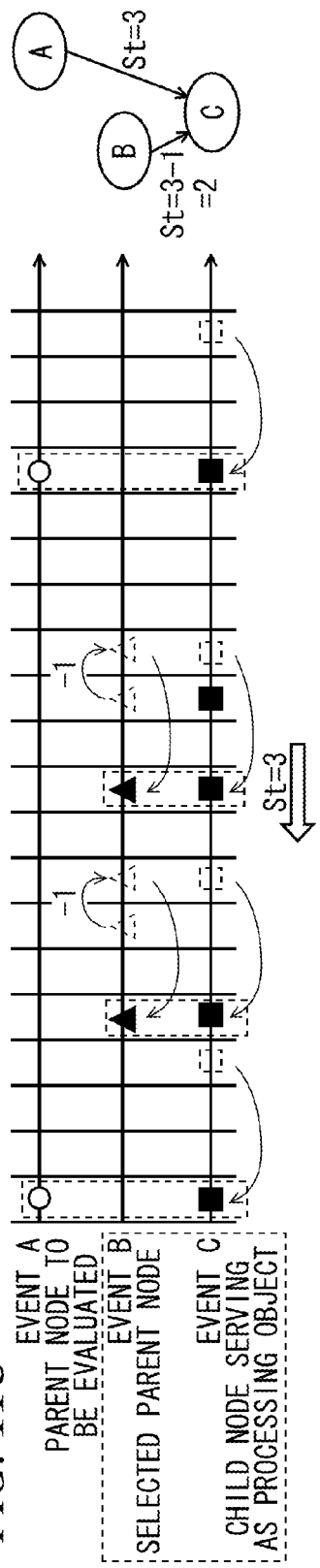

For example, FIG. 11C illustrates an example of a case where the device event A is set as a parent node candidate to be evaluated when the device event B is selected as the parent node of the device event C at the shift amount St=1. This example indicates that when the device event B is selected, the relative shift amount of the device event B to the device event C is −1, and that the evaluation value of the device event A is maximized when the device event C and the device event B having a relative shift amount of −1 to the device event C are shifted as a set by the shift amount St=3. In this case, the shift amount of the device event B itself is 3−1=2.

In step S3107, the above processing is repeatedly performed on all unselected parent node candidates. Thus, the processing to calculate the maximum evaluation value at each of the unselected parent node candidates is performed in step S310.

Turning back to the description of the flowchart illustrated in FIG. 7, in step S311, one of the unselected parent node candidates being highest in the maximum evaluation value is extracted together with the shift amount St at that time. If the evaluation value is not higher than the evaluation value before unselected parent node is added (No in step S312), the next child node serving as a processing object is set in steps S314 and S301 without adding an unselected parent node. Then, the above processing is repeated.

If the maximum evaluation value corresponding to the extracted unselected parent node candidate is higher than the evaluation value (Yes in step S312), in step S313, the extracted unselected parent node candidate is added as a parent of the child node serving as a processing object, together with information representing the associated shift amount.

If there is an unselected parent node candidate in the parent node candidate list in step S309, the process subsequent to the processing in step S310 to calculate the maximum evaluation value at each unselected parent node candidate is repeated.

Figure 12:
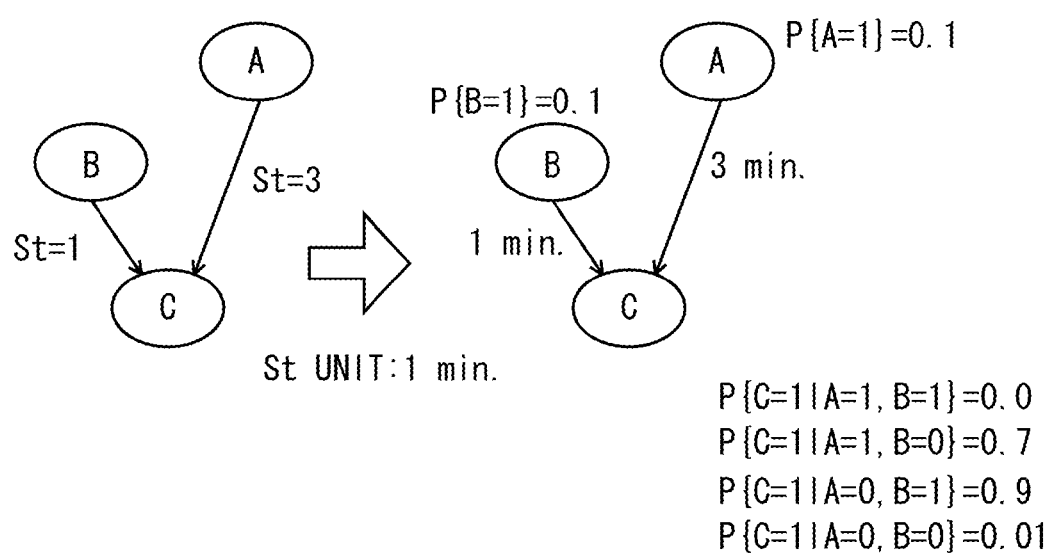
FIG. 12 is a drawing illustrating a constructed Bayesian network.

The above process is repeatedly performed until unprocessed child nodes are not left in step S314. Thus, a Bayesian network is constructed including information representing the shift amount. As illustrated in FIG. 12, according to the constructed Bayesian network, the causal relationship among the device events can be represented by a directed graph with probabilities. Moreover, the occurrence-time difference between the child node and the parent node can be obtained, based on the shift amount at the time of selecting the parent node. Consequently, the occurrence-time difference among the device events can be represented quantitatively.

In the foregoing description, the Bayesian network constructing procedure obtained by improving the K2-algorithm has been described. However, this invention can be applied to Bayesian network constructing methods, such as the maximum weight spanning tree (MWST) algorithm, other than the K2-algorithm.

Figure 13:
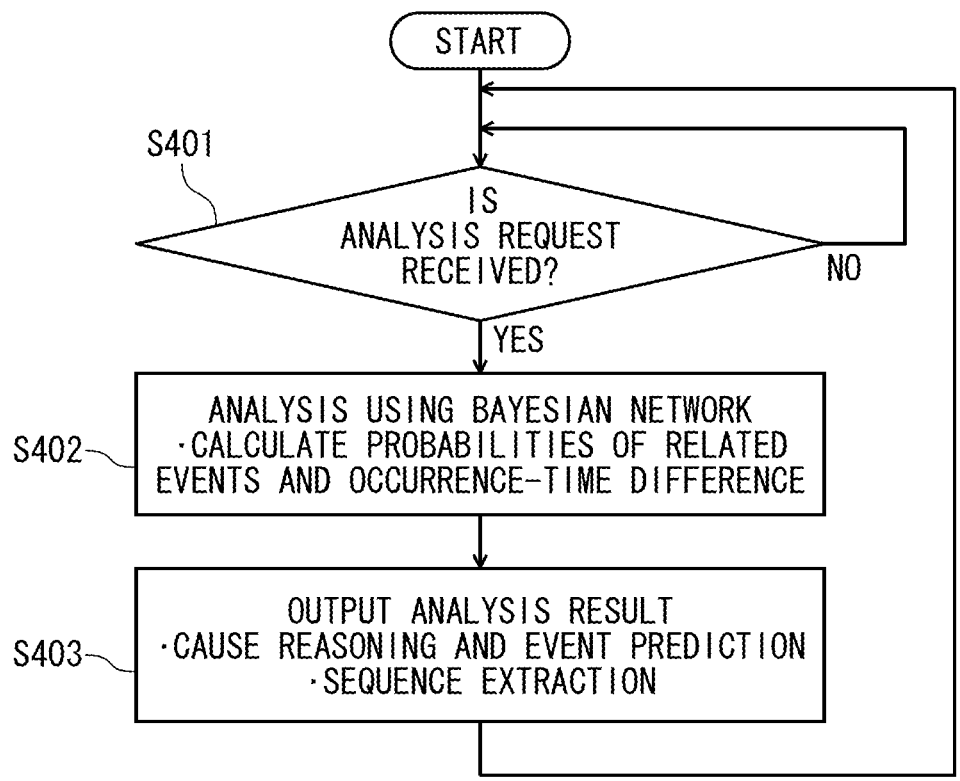
FIG. 13 is a flowchart illustrating a process of performing analysis by an analysis module using a Bayesian network.
Figure 14:
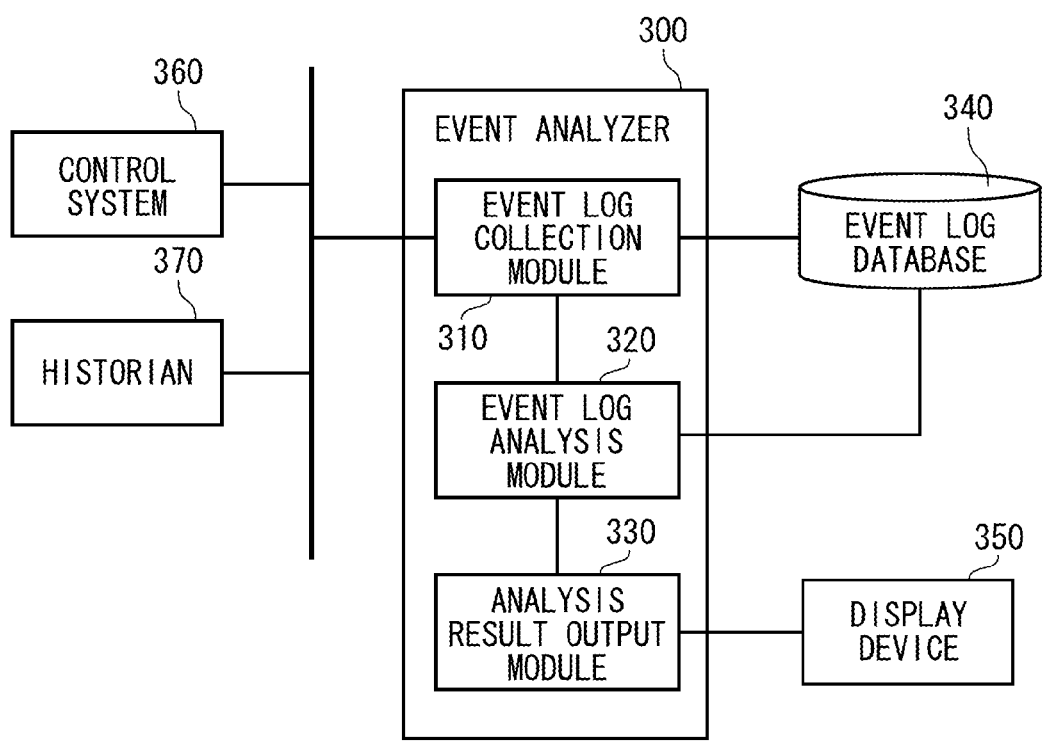
FIG. 14 is a block diagram illustrating the configuration of a related-art event analyzer.

Next, a process of performing analysis by the analysis module 133 using a Bayesian network is described with reference to a flowchart illustrated in FIG. 13.

When the analysis module 133 receives an analysis request from a user (Yes in step S401), in step S402, analysis using the Bayesian network is performed. Users can make requests for analysis on occurred alarms, frequent alarms, operations to be performed, and the like. Furthermore, users can make an analysis request offline in order to improve the efficiency of the plant, and the like.

According to the analysis using the Bayesian network, a device event serving as a cause of a device event to be analyzed and a possible future device event, and their probabilities can be calculated using stochastic reasoning. A typical stochastic reasoning algorithm is a probability propagation method.

According to this embodiment, in order to presume a cause of a device event, a path to a root from an observed device event is traced by referring to the structure of the Bayesian network. Then, a device event at the position of the root is extracted as a main cause candidate. The occurrence probability of the main cause candidate is calculated by stochastic reasoning. Moreover, the occurrence time of the main cause candidate is estimated from the occurrence time of the observed device event, based on information representing the occurrence-time difference between the device events.

For example, if the device event C is observed in the Bayesian network illustrated in FIG. 12, the cause of occurrence of the device event C may be the device event A or the device event B. It can be estimated by performing calculation based on the probability propagation method that the probability, at which the device event A occurs 3 minutes earlier, is 41%, and that the probability, at which the device event B occurs 1 minute earlier, is 53%.

Further, in order to predict a possible future device event from the observed device event, a child node and a descendant node are extracted as a candidate of the possible future device event by referring to the structure of the Bayesian network. Then, the probability of occurrence of each of the device event candidates is calculated by stochastic reasoning. Moreover, the occurrence time of a predicted device event is estimated from the occurrence time of the observed device event, based on the information representing the occurrence-time difference between the device events.

For example, if the device event A is observed in the Bayesian network illustrated in FIG. 12, it can be predicted by performing calculation based on the probability propagation method that the probability, at which the device event C occurs 3 minutes later, is 63%. If the device event B is observed in the Bayesian network, it can be predicted by performing calculation based on the probability propagation method that the probability, at which the device event C occurs 1 minute later, is 81%.

In step S403, results of the analysis using the Bayesian network can be displayed in the display device 230, printed by a printer (not shown), or output as electronic data via the analysis result output module 140.

Output information is not limited to cause reasoning information and event prediction information. For example, a sequence of routine serial-operations may be extracted based the causal relationship and the occurrence-time difference of alarms/operational-feelings, and output as analysis results. The extracted sequence is used as information for automating constantly repeated operations. Thus, the stabilization and the efficiency-improvement of plant operations can be achieved.

The Bayesian network can be used as the aid to not only the grasping of the causal relationship among the device events but also the grouping of the device events by constructing the Bayesian network. More specifically, alarms, such as tailgating alarms, which is high in the probability of simultaneous occurrence of alarms and in high in the cooperativity, are treated by combining such alarms with one another. Thus, the number of times of occurrence of alarms in a plant can be reduced.

In addition, based on the causal relationship among the device events, the cause of occurrence of unnecessary alarms can be specified. Further, the occurrence probability and the occurrence time of important alarms can be predicted. The countermeasure performed at the occurrence of alarm in the past can be presented. Moreover, a lag time from a moment at which an alarm occurs, to another moment, at which an operator responds to the alarm, can be grasped.

What is claimed is:

1. An event analyzer configured to analyze events including alarms which occur in a plurality of devices, and operations which are performed on the plurality of devices, the event analyzer, comprising:
an event log collection module configured to collect an event log including occurrence-time-and-date of the event, a device identifier, and an event-type identifier;
an event log storage module configured to convert the event log into an event matrix that represents, in chronological order, presence/absence of occurrence of each device event obtained by combining the device identifier with the event type identifier with each other, and to store the event matrix;
an event occurrence-order determination module configured to determine occurrence-order of device events, based on the event matrix;
a Bayesian network generation module configured to specify device events serving as parent node candidates with respect to a device event serving as a processing object, based on the occurrence-order, to calculate evaluation values corresponding to each specified parent node candidate, based on an information amount reference, at a virtual device event obtained by shifting the device event serving as a processing object each unit time, and to select an device event serving as a parent node together with a shift amount, thereby to generate a Bayesian network; and
an analysis module configured to output a device event estimated as a cause of a device event to be analyzed, or a device event estimated to occur later, together with time-difference information based on the shift amount.

2. The event analyzer according to claim 1, wherein the event occurrence-order determination module divides the event matrix into time windows having a predetermined time width, and determines occurrence-order of entirety of the device events, based on occurrence-order of device events in each time window.

3. The event analyzer according to claim 2, wherein, in a case where another parent node is selected, from unselected parent node candidates, for the device event serving as a processing object for which parent nodes have been selected, the Bayesian network generation module calculates the evaluation values, based on the information amount reference, at the virtual-device event obtained by shifting selected parent nodes and the device event serving as a processing object as a set of nodes each unit time, in a state in which a relative-shift amount of each of the selected parent nodes to the device event serving as a processing object at the time of selecting the parent node is maintained.

4. The event analyzer according to claim 3, wherein a maximum value of the shift amount is equal to the time width of each time window.

5. A non-transitory computer-readable storage medium, storing a program which allows a computer to function as an event analyzer configured to analyze events including alarms which occur in a plurality of devices, and operations performs on the plurality of devices, the event analyzer, comprising:
an event log collection module configured to collect an event log including occurrence-time-and-date of the event, a device identifier, and an event-type identifier;
an event log storage module configured to convert the event log into an event matrix that represents, in chronological order, presence/absence of occurrence of each device event obtained by combining the device identifier with the event type identifier with each other, and to store the event matrix;

an event occurrence-order determination module configured to determine occurrence-order of device events, based on the event matrix;

a Bayesian network generation module configured to specify device events serving as parent node candidates with respect to a device event serving as a processing object, based on the occurrence-order, to calculate evaluation values corresponding to each specified parent node candidate, based on an information amount reference, at a virtual device event obtained by shifting the device event serving as a processing object each unit time, and to select an device event serving as a parent node together with a shift amount, thereby to generate a Bayesian network; and an analysis module configured to output a device event estimated as a cause of a device event to be analyzed, or a device event estimated to occur later, together with time-difference information based on the shift amount.

* * * * *